United States Patent
Olarig et al.

(10) Patent No.: US 10,394,604 B2
(45) Date of Patent: Aug. 27, 2019

(54) METHOD FOR USING LOCAL BMC TO ALLOCATE SHARED GPU RESOURCES INSIDE NVME OVER FABRICS SYSTEM

(71) Applicant: Samsung Electronics Co., Ltd., Suwon-si, Gyeonggi-do (KR)

(72) Inventors: Sompong Paul Olarig, Pleasanton, CA (US); David Schwaderer, Saratoga, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 268 days.

(21) Appl. No.: 15/603,437

(22) Filed: May 23, 2017

(65) Prior Publication Data

US 2018/0267836 A1    Sep. 20, 2018

Related U.S. Application Data (60) Provisional application No. 62/471,942, filed on Mar. 15, 2017.

(51) Int. Cl.
*G06F 9/50*    (2006.01)

(52) U.S. Cl.
CPC ...... *G06F 9/5027* (2013.01); *G06F 2209/509* (2013.01)

(58) Field of Classification Search
CPC .... G06F 9/5016; G06F 9/5027; G06F 9/5033; G06F 9/5044; G06F 9/505; G06F 9/5055; G06F 2209/509
See application file for complete search history.

(56) References Cited

U.S. PATENT DOCUMENTS

| | | | | |
|---|---|---|---|---|
| 4,727,487 | A | * | 2/1988 | Masui ............ G06F 9/50 706/52 |
| 8,917,734 | B1 | * | 12/2014 | Brown ............ H04L 49/35 370/400 |
| 8,996,781 | B2 | | 3/2015 | Schuette et al. |
| 9,021,189 | B2 | | 4/2015 | Salessi |

(Continued)

OTHER PUBLICATIONS

Bae, Duck-Ho et al., "Intelligent SSD: A Turbo for Big Data Mining", CIKM '13 Proceedings of the 22nd ACM international conference on Information & Knowledge Management, Oct. 27, 2013, pp. 1573-1576.

*Primary Examiner* — Emerson C Puente
*Assistant Examiner* — Zhi Chen
(74) *Attorney, Agent, or Firm* — Renaissance IP Law Group LLP (57) ABSTRACT

According to one general aspect, a system may include a non-volatile memory (NVM), a resource arbitration circuit, and a shared resource. The non-volatile memory may be configured to store data and manage the execution of a task. The non-volatile memory may include a network interface configured to receive data and the task, a NVM processor configured to determine if the processor will execute that task or if the task will be assigned to a shared resource within the system, and a local communication interface configured to communicate with at least one other device within the system. The resource arbitration circuit may be configured to receive a request to assign the task to the shared resource, and manage the execution of the task by the shared resource. The shared resource may be configured to execute the task.

20 Claims, 5 Drawing Sheets

(56) References Cited

U.S. PATENT DOCUMENTS

| | | | |
|---|---|---|---|
| 9,530,178 B2 | 12/2016 | Herr et al. | |
| 2008/0168125 A1* | 7/2008 | Chen | G06F 9/5027 |
| | | | 709/202 |
| 2013/0283286 A1* | 10/2013 | Lee | G06F 9/50 |
| | | | 718/104 |
| 2014/0059558 A1* | 2/2014 | Davis | G06F 9/5044 |
| | | | 718/103 |
| 2014/0136766 A1* | 5/2014 | Smith | G06F 3/0626 |
| | | | 711/103 |
| 2016/0283247 A1* | 9/2016 | Venkatasubramanian | |
| | | | G06F 9/3861 |
| 2016/0292009 A1* | 10/2016 | Kaplan | G06F 9/5027 |
| 2016/0321200 A1 | 11/2016 | Long et al. | |

\* cited by examiner

METHOD FOR USING LOCAL BMC TO ALLOCATE SHARED GPU RESOURCES INSIDE NVME OVER FABRICS SYSTEM

CROSS-REFERENCE TO RELATED APPLICATION

This application claims priority under 35 U.S.C. § 119 to Provisional Patent Application Ser. No. 62/471,942, entitled "METHOD FOR USING LOCAL BMC TO ALLOCATE SHARED GPU RESOURCES INSIDE NVME OVER FABRICS SYSTEM" filed on Mar. 15, 2017. The subject matter of this earlier filed application is hereby incorporated by reference.

TECHNICAL FIELD

This description relates to processing data, and more specifically using local a BMC to allocate shared GPU resources inside a NVMe over fabrics system.

BACKGROUND

A baseboard management controller (BMC) is generally a specialized service processor that monitors the physical state of a computer, network server or other hardware device using sensors and communicating with the system administrator through an independent connection. The BMC is often part of the Intelligent Platform Management Interface (IPMI) and is usually contained in the motherboard or main circuit board of the device to be monitored.

The baseboard management controller (BMC) frequently provides the intelligence in the IPMI architecture. It generally is a specialized microcontroller embedded on the motherboard of a computer—generally a server. The BMC often manages the interface between system-management software and platform hardware.

Generally, different types of sensors built into the computer system report to the BMC on parameters such as temperature, cooling fan speeds, power status, operating system (OS) status, etc. The BMC often monitors the sensors and can send alerts to a system administrator if any of the parameters do not stay within pre-set limits, indicating a potential failure of the system. The administrator can also remotely communicate with the BMC to take some corrective actions—such as resetting or power cycling the system to, for example, get a hung operating system running again. These abilities save on the total cost of ownership of a system.

Peripheral Component Interconnect (PCI) Express (PCIe or PCI-e) is a high-speed serial computer expansion bus standard, designed to replace the older bus standards. PCIe has numerous improvements over the older standards, including higher maximum system bus throughput, lower Input/Output (I/O) pin count and smaller physical footprint, better performance scaling for bus devices, a more detailed error detection and reporting mechanism (e.g., Advanced Error Reporting), and native hot-plug functionality. More recent revisions of the PCIe standard provide hardware support for I/O virtualization. PCI Express is based on point-to-point topology, with separate serial links connecting every device to the root complex (host). In terms of bus protocol, PCI Express communication is generally encapsulated in packets.

Non-Volatile Memory (NVM) Express (NVMe) or Non-Volatile Memory Host Controller Interface Specification (NVMHCI) is a logical device interface specification for accessing non-volatile storage media attached via, in the original version, to a PCIe bus. Non-volatile memory is commonly flash memory that comes in the form of solid-state drives (SSDs). NVM Express, as a logical device interface, has been designed from the ground up to capitalize on the low latency and internal parallelism of flash-based storage devices, mirroring the parallelism of contemporary CPUs, platforms and applications.

NVMe is an alternative to the Small Computer System Interface (SCSI), or more specifically the Serial Attached SCSI, standard for connecting and transferring data between a host and a peripheral target storage device or system. SCSI became a standard in 1986, when hard disk drives (HDDs) and tape were the primary storage media. NVMe is designed for use with faster media, such as solid-state drives (SSDs) and post-flash memory-based technologies One of the main distinctions between NVMe and NVMe over Fabrics (NVMe-oF, NVMe/F, NVMef, or NVMf) is the mechanism for sending and receiving commands and responses. NVMe over Fabrics uses a message-based model to communicate between a host and target storage device. NVMe over Fabrics enables the use of alternate transports (e.g., alternative to PCIe) to extend the distance over which an NVMe host device and an NVMe storage drive or subsystem can connect.

Fabric transports for NVMe may include:

NVMe over Fabrics using remote direct memory access (RDMA). Variations of such include RDMA over converged Ethernet (RoCE or eRDMA) and Internet wide area RDMA protocol (iWARP) for Ethernet and InfiniB and; and NVMe over Fabrics using Fibre Channel (FC-NVMe). Fibre Channel allows the mapping of other protocols on top of it, such as NVMe, SCSI, and IBM's proprietary Fibre Connection (FICON), to send data and commands between host and target storage devices.

SUMMARY

According to one general aspect, a system may include a non-volatile memory (NVM), a resource arbitration circuit, and a shared resource. The non-volatile memory (NVM) may be configured to store data and manage the execution of a task. The non-volatile memory (NVM) may include a network interface configured to receive data and the task, a NVM processor configured to determine if the processor will execute that task or if the task will be assigned to a shared resource within the system, and a local communication interface configured to communicate with at least one other device within the system. The resource arbitration circuit may be configured to receive a request to assign the task to the shared resource, and manage the execution of the task by the shared resource. The shared resource may be configured to execute the task.

According to another general aspect, an apparatus may include a switched fabric configured to communicate with a plurality of non-volatile memory devices. The apparatus may include a resource arbitration circuit configured to receive a request, from a requesting non-volatile memory device, to assign a task to a shared processor, and manage the execution of the task by the shared processor. The apparatus may also include the shared processor that is configured to execute the task.

According to another general aspect, a method may include receiving, by a non-volatile memory (NVM), data via a Non-Volatile Memory Express over Fabric protocol. The method may include determining, by a NVM processor, if the data is to be processed by a shared processor that is external to the NVM. The method may include, if so, forwarding, via a local expansion bus, the data to a resource arbitration circuit that is external to the NVM. The method may include, if so, processing the data by the shared processor. The method may include, if so, returning, via the local expansion bus, the processed data to the NVM.

The details of one or more implementations are set forth in the accompanying drawings and the description below. Other features will be apparent from the description and drawings, and from the claims.

A system and/or method for processing data, and more specifically using local a BMC to allocate shared GPU resources inside a NVMe over fabrics system, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1A:
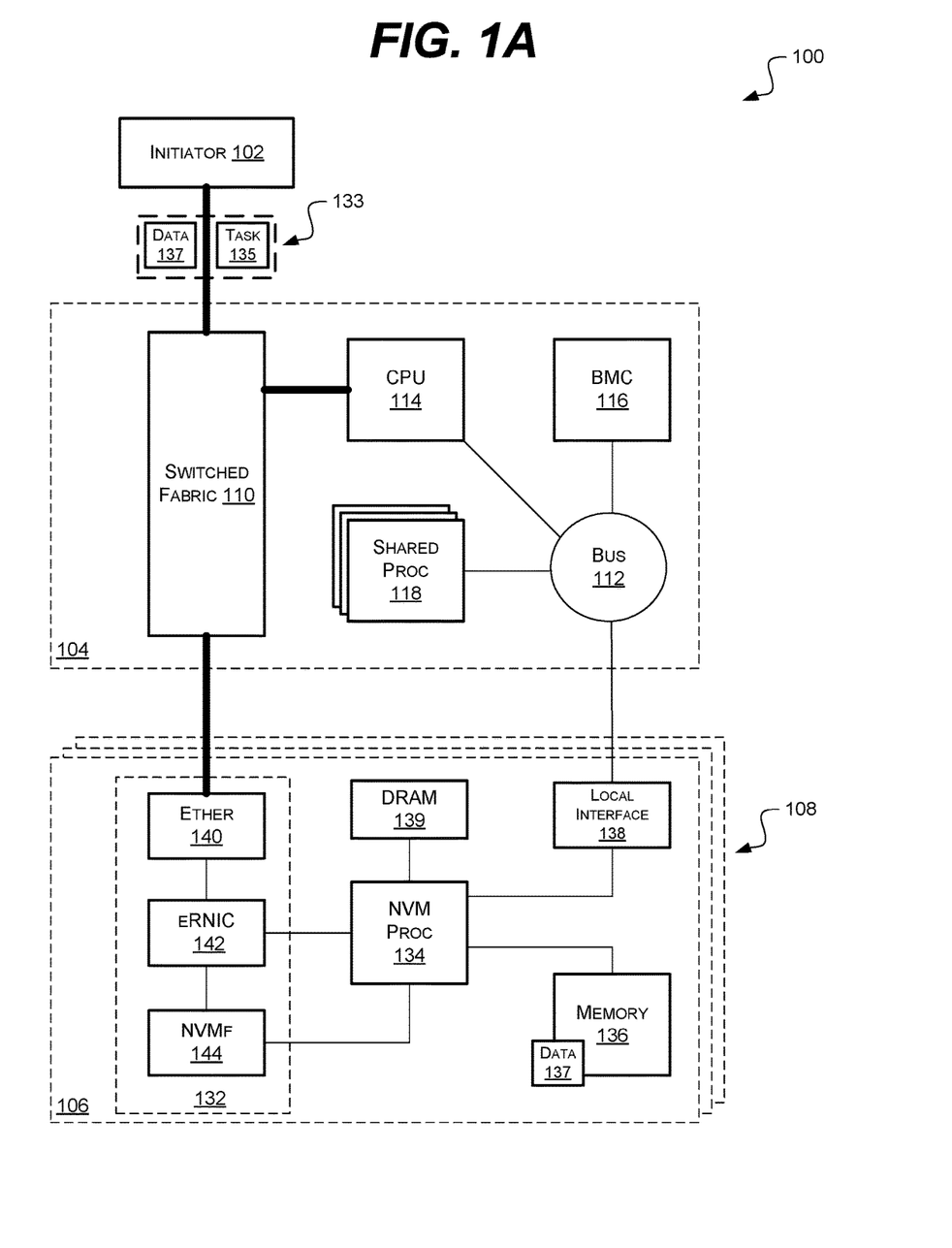
FIG. 1A is a block diagram of an example embodiment of a system in accordance with the disclosed subject matter.

FIG. 1A is a block diagram of an example embodiment of a system 100 in accordance with the disclosed subject matter. The system 100 may include a computing device, such as, for example, a laptop, desktop, workstation, personal digital assistant, smartphone, tablet, and other appropriate computers or a virtual machine or virtual computing device thereof. The system 100 may include a single machine housed within a chassis. It is understood that the above is merely one illustrative example to which the disclosed subject matter is not limited.

In such an embodiment, the system 100 may include a main board or component 104, and one or more non-volatile memory (NVM) devices or drives 106 (or as a plurality, NVMs 108). The initiator device 102 may, in some embodiments, be external to the system 100 or chassis (e.g., another machine). But, in another embodiment, the initiator device 102 may include a component or device within the system 100.

In the illustrated embodiment, the initiator device 102 may start or initiate an action or task 135 to be performed. In various embodiments, this may be done via a sending a message 133 over an NVMe-oF network. In such an embodiment, the NVMe-oF network may include the initiator device 102, the switched fabric or fabric switch 110, and the NVM 106. The message 133 may include the task 135 and, in some embodiments, a set or piece of data 137 upon which the task 135 is to be performed. The message 133 may also include a target or destination for the message 133 (e.g., the specific NVM 106). In some embodiments, the message 133 may simply just include the data 137 and the data 137 may then be stored by the target NVM 106.

In the illustrated embodiment, the message 133 may be received by the system 100. In such an embodiment, the system 100 and the main board 104 may include a switched fabric 110. The switched fabric 110 may be configured to connect a network of devices or components. In the illustrated embodiment, the switched fabric 110 (and the network it connects to) may include an Ethernet switch. It is understood that the above is merely one illustrative example to which the disclosed subject matter is not limited.

In the illustrated embodiment, the switched fabric 110 may connect and route data between the initiator device 102, and the plurality of NVMs 108. Although, in various embodiments, a single initiator device 102 may only communicate with a single NVM 106 at a time. In various embodiments, the switched fabric 110 may also communicate with the CPU 114. In the illustrated embodiment, the message 133 may be routed to the target NVM 106.

In the illustrated embodiment, the NVM 106 may include a network interface 132, a local or NVM processor 134, a local or bus interface 138, and a memory 136. In such an embodiment, the network interface 132 may be configured to communicate with the switched fabric's network and receive messages 133 (e.g., data 137 and tasks 135).

In the illustrated embodiment, the network interface 132 may include an ethernet interface 140; although, it is understood that the above is merely a one illustrative example to which the disclosed subject matter is not limited. The network interface 132 may include an Ethernet Remote Direct Memory Access (RDMA) network interface card/connection (eRNIC) 142. The network interface 132 may also include a NVMf 144 interface. In such an embodiment, the NVM 106 may be configured to communicate in a number of ways over Ethernet (or a respective protocol) and may be referred to as an Ethernet solid state device (eSDD). It is understood that the above is merely one illustrative example to which the disclosed subject matter is not limited.

In some embodiments, the data 137 from the message 113 may be stored in the memory 136. In various embodiments, the memory 136 may include non-volatile memory, such as for example, flash memory. In various embodiments, the NVM 106 may also include a volatile memory 139 (e.g., Dynamic Random Access memory (DRAM)) in addition to the non-volatile memory 136. In such an embodiment, the volatile memory 139 may be used as a working or temporary memory for the NVM processor 134 or other components; it is understood that the above is merely one illustrative example to which the disclosed subject matter is not limited. In some embodiments, the data 137 may already be stored by the memory 136 and the task 135 may simply access or be associated with the data 137.

In the illustrated embodiment, the NVM processor 134 may be configured to determine if it can or should perform the task 135 as requested. In various embodiments, the message 133 (data 137 or task 135) may include a field, tag, or portion that includes a hint to the NVM processor 134 as to what type of task 135 is to be performed. In various embodiments, this hint information may be included by software, either dynamically during the task creation or as part of a software compilation operation. It is understood that the above is merely one illustrative example to which the disclosed subject matter is not limited.

In some embodiments, the NVM processor 134 may be able or most desirable to perform the task 135. In which case, the NVM processor 134 may do that.

In another embodiment, the NVM processor 134 may be aware of other shared resources (e.g., the shared processor 118) within the system 100 that are capable, and possibly better equipped to perform the task 135. In such an embodiment, the NVM processor 134 may attempt or request that the performance of the task 135 be off-loaded to this shared resource 118.

In the illustrated embodiment, the main board 104 may include a CPU 114. It may also include a resource arbitration circuit, or in this specific embodiment a baseboard management controller (BMC) 116. As described above, a traditional BMC 116 merely polls the resources of a system (e.g., system 100) and determines their capabilities and general status (e.g., temperature, fan speed, the existence of a graphical processing unit).

However, in the illustrated embodiment, the computing power of the BMC 116 may be employed in a more active manner. In the illustrated embodiment, the BMC 116 may be configured to monitor, arbitrate, and allocate the usage of shared resources (e.g., shared processor 118) amongst the active storage components (e.g., the NVMs 108) of the system 100. In such an embodiment, the BMC 116 may monitor the resource usage (e.g., number of idle cycles, percentage capacity) of the shared processor 118. The BMC 116 may also receive and respond to requests to use the shared resources (e.g., from the NVMs 108), and determine which (if any) of the requesting devices (e.g., NVMs 108) are allowed to use the shared resources. The BMC 116 may also be configured to notify the requesting devices when their respective tasks are completed and transfer any results back to the requesting devices.

In the illustrated embodiment, the main board 104 may include a communications system or bus 112 for local communication. In this context, "local" means within the system 100 or the chassis that encloses the system 100. In various embodiments, the bus 112 may include a PCIe bus or a PCIe switch, as described above.

The main board 104 may also include one or more shared resources, such as a shared processor 118. In such an embodiment, the shared processor 118 may be configured to complete tasks 135 assigned to the system 100 as a whole. In some embodiments, the shared resources may even include the CPU 114. In the illustrated embodiment, the shared processor 118 may include a graphics processing unit (GPU) or other specialized processor (e.g., a digital signal processor (DSP), a field programmable gate array (FPGA), or the like). In such an embodiment, the shared processor 118 may have capabilities or expertize in performing certain types of tasks that more generalized processors (e.g., CPU 114) or limited processors (e.g., a NVM processor 134) may not have, or could perform but with less efficiency. In such an embodiment, these processors may be shared, whereas the generalized or limited processors may not be. It is understood that the above are merely a few illustrative examples to which the disclosed subject matter is not limited.

In the illustrated embodiment, the bus 112 may connect the BMC 116, the shared processor 118, and the NVMs 108 (via their respective local interfaces 138). In such an embodiment, the BMC 116 can communicate with the NVMs 108 and shared processor 118 without using the Ethernet or switched fabric network. In such an embodiment, the bus 112 may be used for local communication. In some embodiments, the CPU 114 may serve as an intermediary between the local and remote (i.e., going beyond or outside of the system 100) networks.

Returning to the task 135 and the NVM processor 134's decision that the task 135 may be performed by the shared processor 118, in such an embodiment, the NVM 106 may communicate this offloading request to the BMC 116 via the local communication interface 138. The local communication interface 138 may be configured to communicate with other devices (e.g., the BMC 116) within the system 100. In the illustrated embodiment, the local communication interface 138 may send a message to the BMC 116 requesting that the task 135 be performed by the shared processor 118.

In such an embodiment, the BMC 116 may check the availability or capability of the shared processor 118. If the shared processor 118 is sufficiently free (e.g., not used, or only partially used) the BMC 116 may assign the task 135 to the shared processor 118. The shared processor 118 may perform the task 135, and any needed data 137 may be transferred to the shared processor 118 (e.g., via the bus 112). Once the shared processor 118 has completed that task 135, the requesting NVM 106 (and the BMC 116) may be notified and the resultant data 137 may be stored by the NVM 106 or any other storage medium or drive (e.g., any of the NVMs 108, a magnetic hard drive, or the like), as is occasionally indicated by the processing request.

In various embodiments, multiple NVMs 108 may request that they each make use of the shared processor 118. In such an embodiment, the BMC 116 may have to arbitrate amongst those competing requests. In some embodiments, a first-come-first-served model may be employed. In another embodiment, the BMC 116 may allocate partial usage of the shared processor 118 to multiple requesting NVMs 108. In yet another embodiment, a priority scheme may be employed. It is understood that the above are merely a few illustrative examples to which the disclosed subject matter is not limited.

A specific example, to which the disclosed subject matter is not limited, will be used to show a possible way the system 100 may be employed. Deep neural networks (nets), machine learning, or artificial intelligence applications often requires a lot of compute cycles with insignificant I/O waits, and the intermediate data is generally only useful for one iteration. So, there is no need to store it in persistent storage. In this illustrative embodiment, the initiator device 102 may request that a neural network task (e.g., finding a black dog in a series of photos) be performed.

In such an embodiment, the task 135 may be assigned to a given NVM 106. The NVM processor 134 may determine that, since the task 135 involves a large number of iterative computations, many of which can be executed in a parallel, the task 135 may be more efficiently performed by the GPU or shared processor 118. Generally, GPUs include a large plurality of cores designed to perform iterative computations in parallel. It is understood that the above criteria (e.g., iterative task, parallel computation) are merely a few illustrative examples to which the disclosed subject matter is not limited.

In such an embodiment, the NVM 106 may ask the BMC 116 if the GPU or shared processor 118 is available. If so, the neural network task 135 may be assigned and performed by the GPU or shared processor 118. In one embodiment, the data 137 may be kept and accessed from the memory 136. In another embodiment, the data 137 may be transferred to a memory on or more accessible to the main board (not shown). In either case, once the neural network task 135 is completed, the result (e.g., a modified version of data 137, a list of pictures with a black dog, a single value) may be transferred back to the NVM 106. It is understood that the above are merely a few illustrative examples to which the disclosed subject matter is not limited.

Figure 1B:
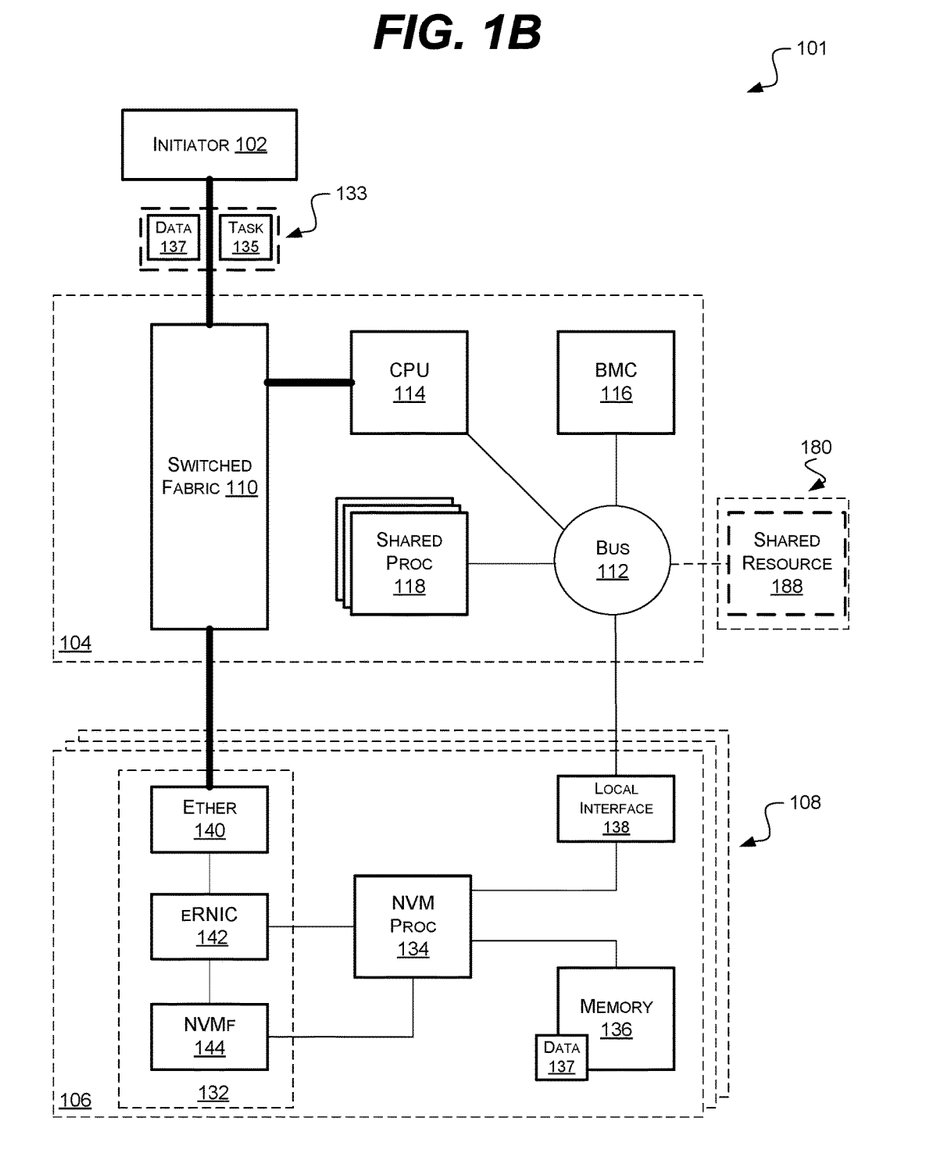
FIG. 1B is a block diagram of an example embodiment of a system in accordance with the disclosed subject matter.

FIG. 1B is a block diagram of an example embodiment of a system 101 in accordance with the disclosed subject matter. The system 101 may be very similar to the system 100, as described above.

As with the system 100 of FIG. 1A, the system 101 may include a main board 104, and a plurality of NVMs 108. As described above, tasks 135 may be offloaded to a shared resource (e.g., shared processor 118) via the resource allocation circuit or BMC 116.

In the illustrated embodiment, the system 101 may exploit or use extra ports on the bus 112 or PCIe switch. In such an embodiment, the system 101 can support additional resource (e.g., processor, memories) cards 180 in the chassis. In such an embodiment, the BMC 116 may manage the additional shared resources 188 that are available to the NVM processors 134.

In one such embodiment, by providing edge connectors or vertical riser cards on the main board 104, or a switch board or backplane (not shown), additional shared resources 188 may be installed. In one embodiment, this may be done in a stacked-up fashion (i.e., one on top of the other) via a PCIe riser card. In one such embodiment, the system 101 can support four GPUs in one chassis (two per one resource board 180). It is understood that the above is merely one illustrative example to which the disclosed subject matter is not limited.

In such an embodiment, a pool of shared resources 188 may be added to a system 101. In such an embodiment, the BMC 116 may arbitrate and allocate the use of those shared resources 188 and shared processing resources 118. In some embodiments, the shared processor 118 may not exit, and only the shared resources 188 provided by resource board 180 may be used. In another embodiment, the shared processing resources 118 may include a plurality of heterogeneous computing resources. It is understood that the above are merely a few illustrative examples to which the disclosed subject matter is not limited.

In various embodiments, the shared resources 118 and 188 may be partitioned and, each partition only accessible by a certain portion of the NVMs 108. In various embodiments, other allocation schemes may be employed. It is understood that the above are merely a few illustrative examples to which the disclosed subject matter is not limited.

Figure 2:
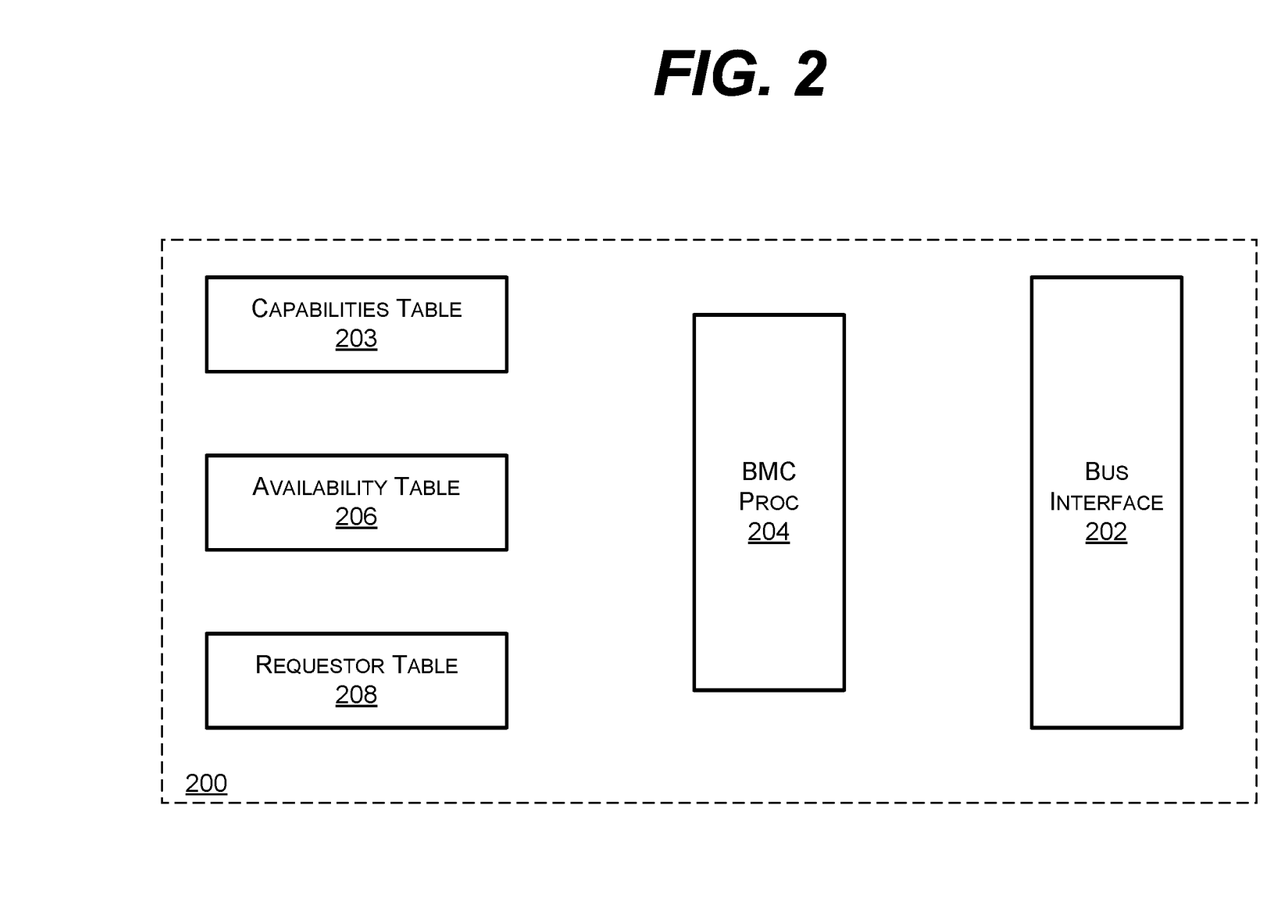
FIG. 2 is a block diagram of an example embodiment of an apparatus in accordance with the disclosed subject matter.

FIG. 2 is a block diagram of an example embodiment of an apparatus 200 in accordance with the disclosed subject matter. In various embodiments, the apparatus 200 may include a resource arbitration circuit configured to receive a request, from a requesting non-volatile memory device, to assign a task to a shared processor, and manage the execution of the task by the shared processor, as described above. In some embodiments, the apparatus 200 may include a baseboard management controller.

In the illustrated embodiment, the apparatus 200 may include a bus interface 202. The bus interface 202 may be configured to receive and send messages to/from other devices in the same system as the apparatus 200. For example, if the apparatus 200 is a BMC, the bus interface 200 may poll the various devices in the system and report their status or existence (e.g., temperature, fan speed). In the illustrated embodiment, the bus interface 200 may also receive requests to use a shared resource, and respond to those requests (e.g., grant or deny the allocation, assign a task to the shared resource, report on the task's completion).

In various embodiments, the bus interface 202 may be coupled with a local communications bus. In some embodiments, this may be a PCIe bus or a high-speed serial computer expansion bus. In some embodiments, the apparatus 200 may use a first bus interface (and a first bus protocol, such as, for example, an $I^2C$ or SMBus serial bus) to communicate the device status information (e.g., temperature, fan speed), and then a second bus interface 202 (and a second bus protocol, such as, PCIe) to handle shared resource arbitration events. It is understood that the above is merely one illustrative example to which the disclosed subject matter is not limited.

In the illustrated embodiment, the apparatus 200 may include a processor 204 (e.g., a BMC processor). In various embodiments, the processor 204 may be configured to monitor, allocate usage of, arbitrate request for the shared resources, as described above. In various embodiments, the processor 204 may do this by issuing and processing messages sent/received via the bus interface 202.

In the illustrated embodiment, one way for managing the shared resources may include storing and maintaining a plurality of tables 203, 206, and 208. In various embodiments, the apparatus 200 may include the memory for these tables 203, 206, and 208. In another embodiment, the tables may be stored in a memory external to the apparatus 200. In some embodiments, two or more of the tables may be combined into a single data structure.

In one embodiment, a capabilities table 203 may be configured to store the traditional data collected by the BMC (e.g., existence of a GPU, amount of memory, bus speed). In the illustrated embodiment, the capabilities table 203 may also be configured to store information regarding the resources in the system that are shared, such as, for example if the GPU is shared, how many shaders or cores a processor has, if the resource is part of a grouping or partition, and so on. In one such embodiment, the capabilities tables 203 may include a listing of devices in the system and a field indicating if that device is a shared resource. It is understood that the above are merely a few illustrative examples to which the disclosed subject matter is not limited.

In various embodiments, the apparatus 200 may include an availability table 206. In such an embodiment, the availability table 206 may be configured to indicate the availability state of the shared resource(s). In one embodiment, the availability table 206 may indicate the percentage of availability a shared resource may possess at a given time (e.g., 100% used, 50% used, 8 encoding transform units free, 14 vector processors used, and so on). In another embodiment, the availability table 206 may also include a prediction as to when the shared resource will be next available or other time-based measurement. In such an embodiment, the availability table 206 may be checked to see if a resource usage request can be fulfilled. If so, the availability table 206 may then be updated (e.g., by the BMC processor 204) to indicate the updated availability of the given resource. In some embodiments, this updating may include polling the resource or merely marking the whole resource as unavailable until the assigned task completes. It is understood that the above are merely a few illustrative examples to which the disclosed subject matter is not limited.

In the illustrated embodiment, the apparatus 200 may include a requestor table 208. In various embodiments, the requestor table 208 may be configured to associate tasks with the non-volatile memory device that requested the respective task's execution. In such an embodiment, the BMC processor 204 may know which NVM to contact once a given task is complete. In another embodiment, the task of notifying the NVM of that task's completion may fall to the shared resource, instead of the apparatus 200. In one embodiment, once a requested task has been assigned to a shared resource, the processor 204 may modify the requestor table 208 and inform the requesting NVM that its task has been successfully allocated. It is understood that the above are merely a few illustrative examples to which the disclosed subject matter is not limited.

Figure 3:
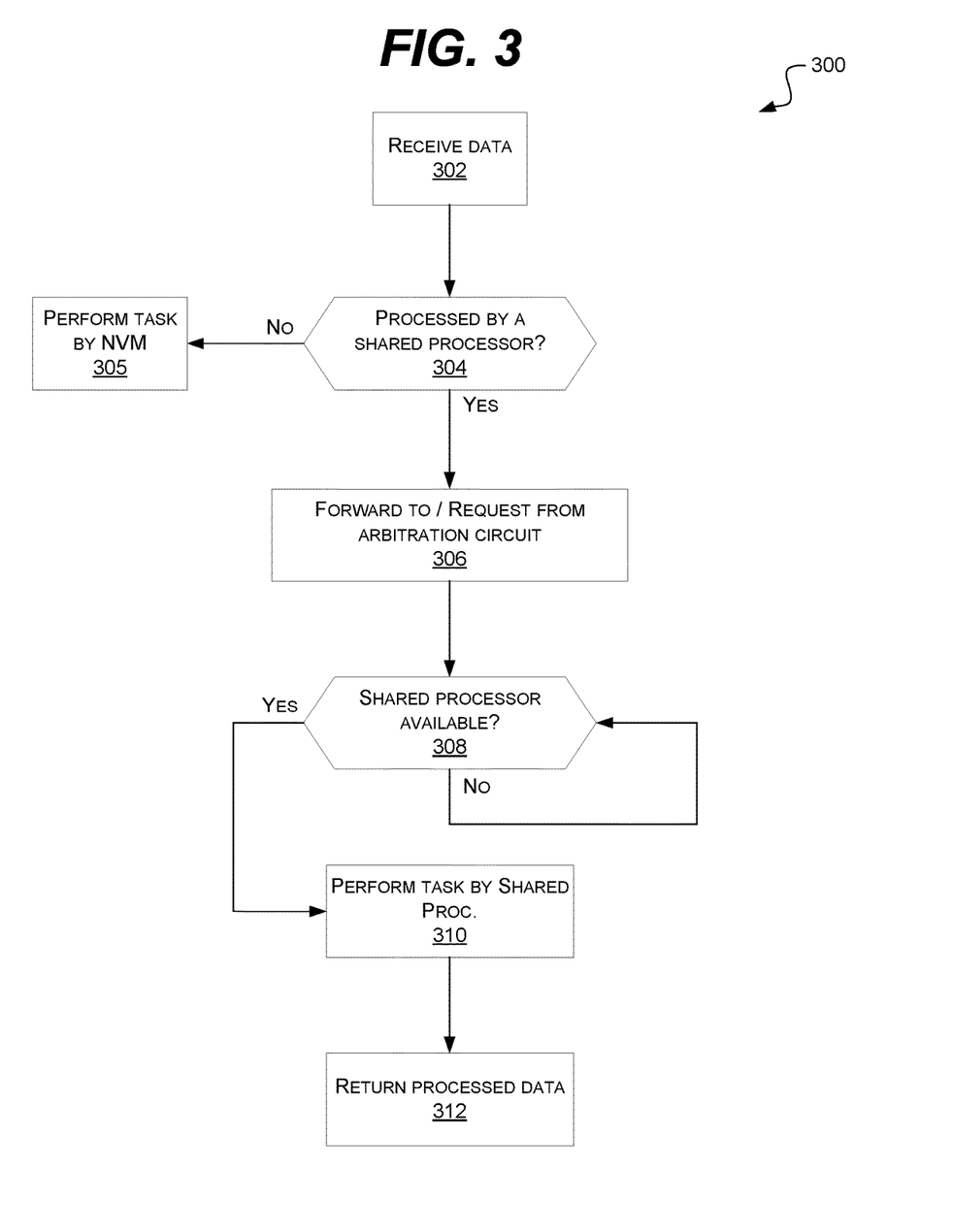
FIG. 3 is a flowchart of an example embodiment of a technique in accordance with the disclosed subject matter.

FIG. 3 is a flow chart of an example embodiment of a technique 300 in accordance with the disclosed subject matter. In various embodiments, the technique 300 may be used or produced by the systems such as those of FIG. 1A, 1B, or 2. Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, data and/or a task may be received via a NVMef network, as described above. In various embodiments, one or more of the action(s) illustrated by this Block may be performed by the apparatuses or systems of FIG. 1A or 1B, the switched fabric 110, NVM 106 or network interface 132 of FIG. 1A or 1B, as described above.

Block 304 illustrates that, in one embodiment, a determination may be made as to whether the data is to be processed by a shared resource or processor, as described above. In various embodiments, the determination may be made as to whether the data is to be processed by a processor within or local to the NVM, as described above. In some embodiments, this decision may be based, at least partially, upon hint information associated with the data. In one such embodiment, the decision may be based upon whether the processing of the data includes machine learning, as described above. In various embodiments, one or more of the action(s) illustrated by this Block may be performed by the apparatuses or systems of FIG. 1A or 1B, the NVM 106 or NVM processor 134 of FIG. 1A or 1B, as described above.

Block 305 illustrates that, in one embodiment, that if the decision was made not to have the data processed by the shared resource, the local NVM processor 134 may perform the task or process the data, as described above. In various embodiments, the processing may be performed by a NVM's local processor, as described above. In various embodiments, one or more of the action(s) illustrated by this Block may be performed by the apparatuses or systems of FIG. 1A or 1B, the NVM 106 or NVM processor 134 of FIG. 1A or 1B, as described above.

Block 306 illustrates that, in one embodiment, that if the decision was made to have the data processed by the shared resource, the data and/or task may be forwarded or transferred to a resource arbitration circuit (e.g., a BMC), as described above. In various embodiments, this request may be made over a local communications bus (e.g., A PCIe bus), as described above. In various embodiments, one or more of the action(s) illustrated by this Block may be performed by the apparatuses or systems of FIG. 1A or 1B, the NVM 106, bus 112, or BMC 116 of FIG. 1A or 1B, as described above.

Block 308 illustrates that, in one embodiment, that the resource arbitration circuit may determine if the requested shared resource (e.g., processor) is available, as described above. In various embodiments, this may include the use of the tables and polling mechanisms described above. In such an embodiment, this may include communicating with the share resource using the local bus (e.g., a PCIe bus) and not the remote or network interface by which the data was first transferred to the NVM (e.g., the NVMef protocol). In various embodiments, one or more of the action(s) illustrated by this Block may be performed by the apparatuses or systems of FIG. 1A or 1B, the shared resources 118 and 188, bus 112, or BMC 116 of FIG. 1A or 1B, the tables 203, 206, or 208 of FIG. 2, as described above.

Block 308 also illustrates that, in one embodiment, if the requested shared resource is not available, the task may simply stall or loop until the shared resource is available. In another embodiment, another sufficiently equivalent resource may be substituted (e.g., another GPU). In yet another embodiment, the request to use the shared resource may be denied and the NVM may process the task itself. In various embodiments, a combination of these or other techniques may be employed (e.g., looping with a time limit constraint). It is understood that the above are merely a few illustrative examples to which the disclosed subject matter is not limited.

Block 310 illustrates that, in one embodiment, that task may be performed or executed by the shared resource, as described above. In various embodiments, one or more of the action(s) illustrated by this Block may be performed by the apparatuses or systems of FIG. 1A or 1B, the shared resources 118 and 188 of FIG. 1A or 1B, as described above.

Block 312 illustrates that, in one embodiment, that the processed data or result may be returned to the requesting NVM, as described above. In one such embodiment, the data may be returned via the local bus (e.g., a PCIe bus) and not the remote or network interface by which the data was first transferred to the NVM (e.g., the NVMef protocol). In various embodiments, one or more of the action(s) illustrated by this Block may be performed by the apparatuses or systems of FIG. 1A or 1B, the shared resources 118 and 188, bus 112, or BMC 116 of FIG. 1A or 1B, the tables 203, 206, or 208 of FIG. 2, as described above.

Figure 4:
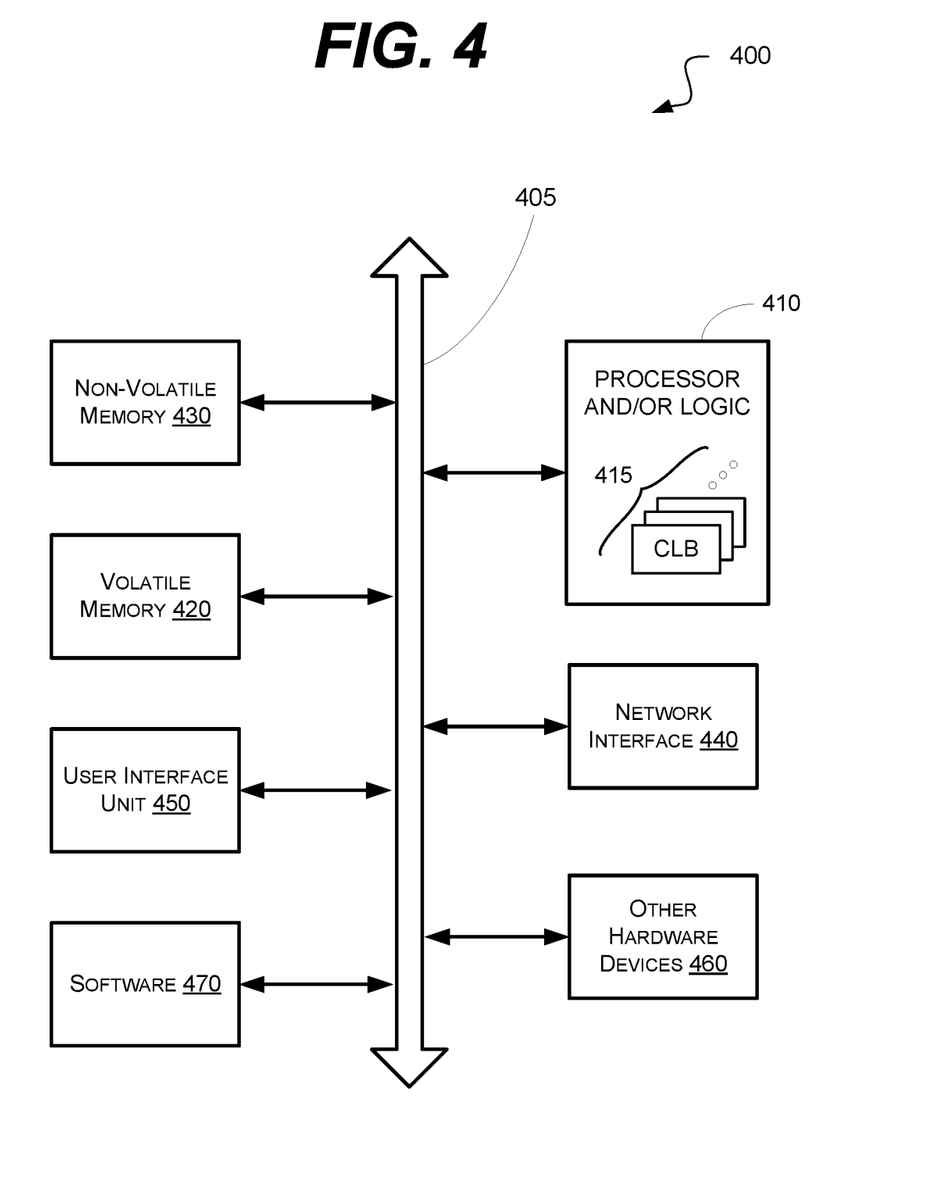
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A system comprising:
a non-volatile memory (NVM) device stores data and manages execution of a task,
and wherein the NVM device comprises:
a network interface configured to receive data and the task,
a NVM processor configured to determine if the NVM processor will execute that task or if the task will he assigned to a shared resource within the system based on the shared resource more efficiently performing the task than the NVM processor, and
a local communication interface configured to communicate with at least one other device within the system;
a main board sub-system comprising:
a switched fabric in communication with the NVM device, wherein the switched fabric sends the data and task to the NVM device as a destination for the task, and
a resource arbitration circuit configured to:
receive, a request to assign the task to the shared resource, and
manage the execution of the task by the shared resource; and
the shared resource configured to execute the task.

2. The system of claim 1, wherein the network interface is configured to receive data and the task via a Non-Volatile Memory Express over Fabric protocol.

3. The system of claim 1, wherein the resource arbitration circuit comprises a baseboard management controller.

4. The system of claim 1, further comprising a plurality of non-volatile memory devices, each configured to request an assignment of a. respective task to the shared resource; and
wherein the resource arbitration circuit configured to:
determine if the shared resource is available for a respective task,
arbitrate between a plurality of requests to assign a respective task to the shared resource,
determine a selected non-volatile memory device that has won the arbitration, and inform the selected non-volatile memory device that the selected non-volatile memory device's task is assigned to the shared resource.

5. The system of claim 1, wherein the shared resource includes a graphics processor.

6. The system of claim 1 wherein, if the task is assigned to the shared resource, data associated with the task is transferred between the non-volatile memory device and the shared resource via the local communication interface.

7. The system of claim 1, wherein the NVM processor is configured to determine if the NVM processor will execute that task or if the task will be assigned to the shared resource, based, at least in part, upon hint information included with the task.

8. The system of claim 1, wherein the task comprises a neural network task.

9. The system of claim 1, wherein, even if the NVM processor determined that the task will be assigned to the shared resource, but the shared resource is not available, the NVM processor is configured to execute the task.

10. An apparatus comprising:
a switched fabric configured to communicate with a plurality at non-volatile memory (NVM) devices, wherein the switched fabric sends tasks to the plurality of NVM devices respectively and each of the NVM devices is a destination for its corresponding task:
a resource arbitration circuit configured to:
receive a request, from a requesting non-volatile memory device from the plurality of NVM devices, to assign a task to a shared processor, wherein a NVM processor of the requesting WM device determines the shared processor more efficiently performs the task than the NVM processor of the requesting NVM device, and
manage the execution of the task by the shared processor; and
the shared processor configured to execute the task.

11. The apparatus of claim 10, wherein the resource arbitration circuit comprises:
a requester table associating tasks with the non-volatile memory device that requested the respective task's execution; and
an availability table indicating the availability state of the shared processor.

12. The apparatus of claim 10, wherein the shared processor is configured to notify the resource arbitration circuit when the task is completed, and
wherein the resource arbitration circuit is configured to notify the requesting non-volatile memory device when the task is completed.

13. The apparatus of claim 10, wherein the resource arbitration circuit and the requesting non-volatile memory device communicate, regarding the task, via a high-speed serial computer expansion bus.

14. The apparatus of claim 13, wherein the high-speed serial computer expansion bus includes a Peripheral Component Interconnect Express bus.

15. The apparatus of claim 13, wherein the shared processor communicates with the resource arbitration circuit and the requesting non-volatile memory device regarding the task, via a high-speed serial computer expansion bus.

16. The apparatus of claim 13, further comprising a local communication bus;
wherein the switched fabric is configured to communicate directly with the plurality of non-volatile memory devices via a network interface of each respective non-volatile memory device, and at least one initiator device that is external to the apparatus, wherein the at least one initiator device transfers data to, at least a portion of, the plurality of non-volatile memory devices via the switched fabric; and
wherein the local communication bus is configured to communicate directly with the shared processor, the resource arbitration circuit, and the plurality of non-volatile memory devices via a local communications interface of each respective non-volatile memory device.

17. A method comprising:
receiving, by a non-volatile memory (NVM) device, data from a switched fabric of a main board sub-system via a Non-Volatile Memory Express over Fabric protocol, wherein the NVM device is a destination for the data;
determining, by a NVM processor of the NVM device, whether the data is to be processed by a shared processor that is external to the NVM device, based on the shared processor more efficiently processing the data than the NVM processor;
forwarding, via a local expansion bus, the data to a resource arbitration circuit of the main hoard sub-system that is external to the NVM device;
processing the data by the shared processor; and
returning, via the local expansion bus, the processed data to the NVM device.

18. The method of claim 17, wherein the shared processor includes a graphical processing unit, and
wherein the local expansion bus includes a Peripheral Component Interconnect Express bus.

19. The method of claim 17, wherein determining comprises determining if the data is to be processed employing machine learning.

20. The method of claim 17, wherein determining includes examining hint information included in the data.

* * * * *